US012658385B2

(12) United States Patent
Goh et al.

(10) Patent No.: US 12,658,385 B2
(45) Date of Patent: Jun. 16, 2026

(54) SYSTEM AND METHOD FOR A QUIET KEYBOARD KEY WITH COATED LINK BAR

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 188 days.

(21) Appl. No.: 18/380,770

(22) Filed: Oct. 17, 2023

(65) Prior Publication Data

US 2025/0125105 A1 Apr. 17, 2025

(51) Int. Cl.
| *H01H 13/84* | (2006.01) |
| *G06F 3/02* | (2006.01) |
| *H01H 13/88* | (2006.01) |

(52) U.S. Cl.
CPC ........... *H01H 13/84* (2013.01); *G06F 3/0202* (2013.01); *H01H 13/88* (2013.01)

(58) Field of Classification Search
CPC ......................... H01H 3/122; G06F 3/02–0208
USPC ........................................................ 200/344
See application file for complete search history.

(56) References Cited

U.S. PATENT DOCUMENTS

| 4,830,526 A | * | 5/1989 | Hosono | ...................... B41J 5/12 |
| | | | | 400/490 |
| 5,376,765 A | * | 12/1994 | Holmes | .................. H01H 3/122 |
| | | | | 200/344 |
| 5,823,325 A | * | 10/1998 | Lin | ........................ H01H 3/125 |
| | | | | 200/344 |
| 10,373,777 B1 | | 8/2019 | Lin | |
| 11,289,286 B2 | * | 3/2022 | Wang | ..................... G06F 3/0202 |
| 11,755,125 B1 | * | 9/2023 | Norbauer | ............. G06F 3/0224 |
| | | | | 345/168 |
| 2004/0074753 A1 | | 4/2004 | Chen | |
| 2018/0350537 A1 | | 12/2018 | Liao | |
| 2019/0304717 A1 | | 10/2019 | Liao | |
| 2020/0066466 A1 | | 2/2020 | Huang | |
| 2021/0020392 A1 | | 1/2021 | Chen | |
| 2021/0090826 A1 | | 3/2021 | Yen | |
| 2021/0296061 A1 | | 9/2021 | Ku | |
| 2022/0189715 A1 | | 6/2022 | Hsu | |

FOREIGN PATENT DOCUMENTS

| WO | 2020/124685 A1 | 6/2020 |
| WO | 2022/170926 A1 | 8/2022 |
| WO | 2022/206711 A1 | 10/2022 |

* cited by examiner

*Primary Examiner* — Renee S Luebke

(74) *Attorney, Agent, or Firm* — Prol Intellectual Property Law, PLLC; H. Kenneth Prol

(57) ABSTRACT

A keyboard operatively couplable to an information handling system may include a keyboard chassis with a plurality of physical keyswitch actuation devices at a plurality of key locations. The keyboard may also include a keyboard key operatively coupled to the keyboard chassis at a first key location via a key link bar. The key link bar may include a bent terminal end operatively coupled to the keyboard key via side hourglass hook on the keyboard key. The key link bar includes a noise-reducing coating formed over the key link bar to reduce noise associated with actuation of the keyboard key during actuation by a user except at c-clip interface sections.

20 Claims, 7 Drawing Sheets

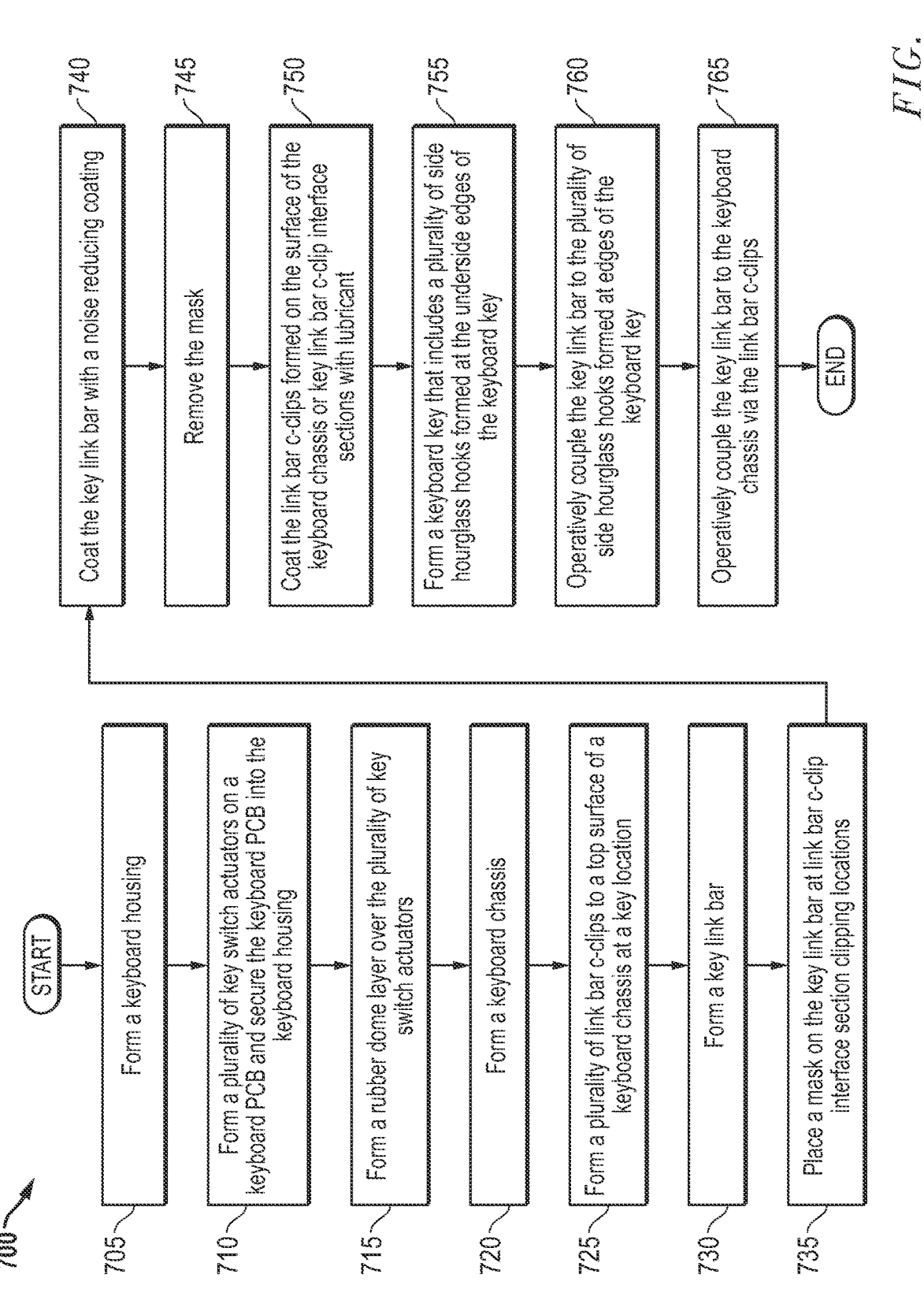

700

START

705 — Form a keyboard housing

710 — Form a plurality of key switch actuators on a keyboard PCB and secure the keyboard PCB into the keyboard housing 715 — Form a rubber dome layer over the plurality of key switch actuators 720 — Form a keyboard chassis 725 — Form a plurality of link bar c-clips to a top surface of a keyboard chassis at a key location 730 — Form a key link bar 735 — Place a mask on the key link bar at link bar c-clip interface section clipping locations 740 — Coat the key link bar with a noise reducing coating 745 — Remove the mask 750 — Coat the link bar c-clips formed on the surface of the keyboard chassis or key link bar c-clip interface sections with lubricant 755 — Form a keyboard key that includes a plurality of side hourglass hooks formed at the underside edges of the keyboard key 760 — Operatively couple the key link bar to the plurality of side hourglass hooks formed at edges of the keyboard key 765 — Operatively couple the key link bar to the keyboard chassis via the link bar c-clips

END

FIG. 7

SYSTEM AND METHOD FOR A QUIET KEYBOARD KEY WITH COATED LINK BAR

FIELD OF THE DISCLOSURE

The present disclosure generally relates to a keyboard key. The present disclosure more specifically relates to a keyboard having a keyboard key that includes a coated link bar for quiet operation.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include an input device such as a keyboard that includes a plurality of keys used to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7 is a flow diagram illustrating a method of manufacturing a keyboard with a keyboard key having a key link bar coated with a noise-reducing coating according to an embodiment of the present disclosure.

The use of the same reference symbols in different drawings may indicate similar or identical items.

DETAILED DESCRIPTION OF THE DRAWINGS

Figure 1:
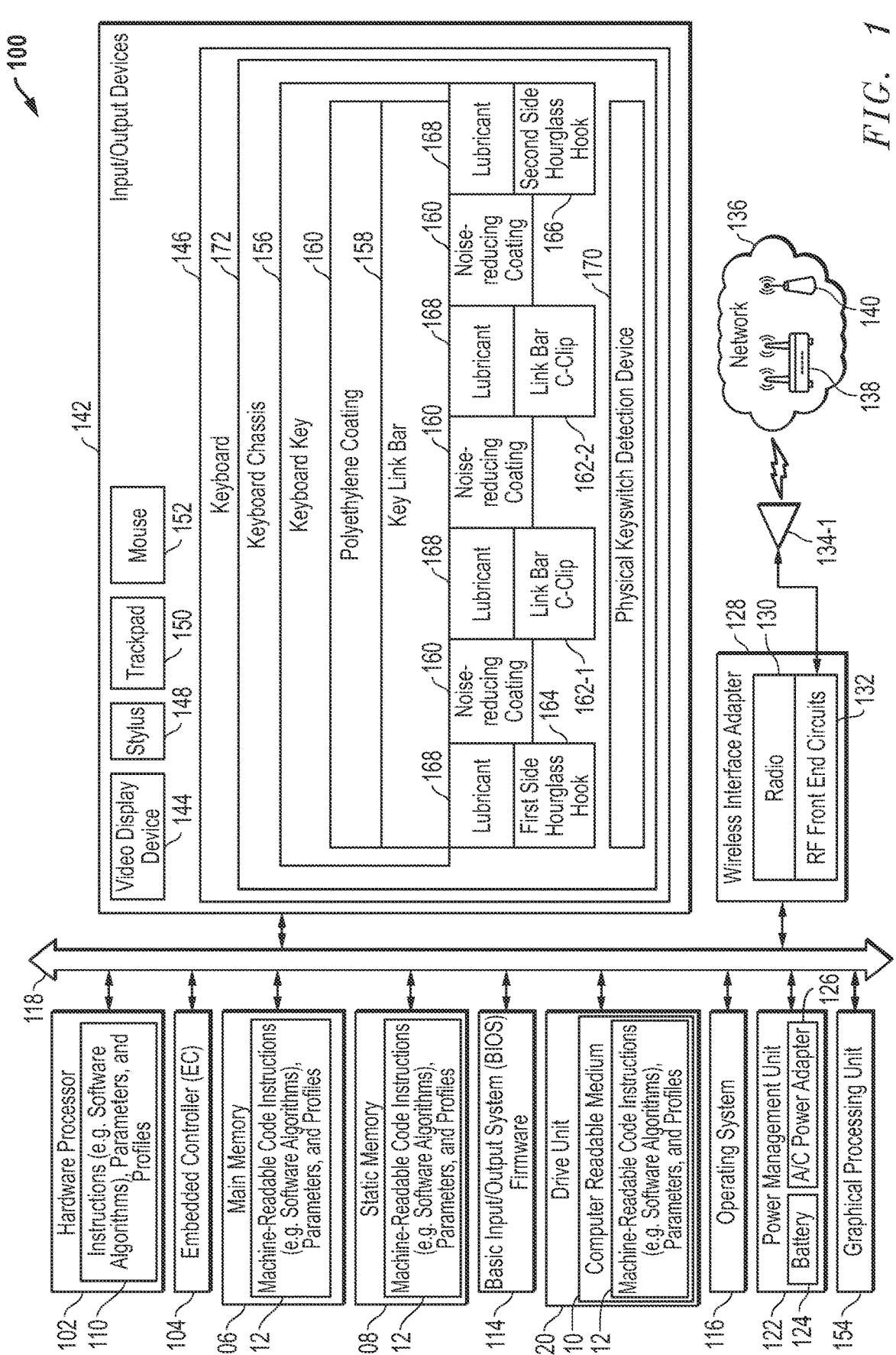
FIG. 1 is a block diagram illustrating an information handling system that includes a keyboard including a plurality of keys which includes a coated link bar according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Keyboards are used by a user to provide input to an information handling system. A keyboard may be wired or wireless. In an embodiment, the keyboard includes a plurality of keys such as those keys generally found on a QWERTY-type keyboard. A majority of the keyboard keys may be relatively small such that a rubber dome, scissor-switch device, butterfly switch device, or other physical key switch actuation devices is used to apply a force against the bottom surface of the keyboard key. These physical key-switch actuator devices can allow a user to press the keyboard key with the physical keyswitch actuator devices registering a keystroke and causing the keyboard key to be returned back to an unpressed states. Some keyboard keys on the keyboard may be larger (e.g., longer) than others, however. With these larger keyboard keys other devices may be used to cause these relatively larger keys to be pressed uniformly down and returned with the entire key moving. Such keyboard keys like the space bar, even when pressed on one side, needs to move downward as a single unit. As such a key link bar or other rod may be used to cause the entire key to, when pressed at any location, move downward, and prevent tilting when actuated and when returned to an unpressed state. However, with the inclusion of this key link bar, the key link bar may cause a rattling noise during its movement resulting in noise produced while a user is typing. This is especially true where the space bar is frequently used.

The present specification describes a keyboard operatively couplable to an information handling system comprising a keyboard housing, plural keyswitch devices, and a keyboard chassis with a keyboard key formed onto the keyboard chassis, and a key link bar operatively coupled to the keyboard key. A noise-reducing coating is formed over the key link bar to reduce noise associated with actuation of the keyboard key by a user. In an embodiment, the link bar is not coated with the noise-reducing coating on c-clip interface sections the link bar where the link bar c-clips secure the link bar to the keyboard chassis. In an embodiment, the noise-reducing coating is a polyethylene coating.

In an embodiment, a plurality of side hourglass hooks are formed at underside edges of the keyboard key. These hourglass hooks are used to secure terminal ends of the key link bar to an underside surface of the keyboard key. The plurality of side hourglass hooks are formed to allow the key link bar to pivot and slide within the plurality of side hourglass hooks as the keyboard key moves up and down.

In an embodiment, a lubricant layer is applied on the plurality of link bar c-clips used to secure the link bar to the keyboard chassis at a key location. Additional lubrication may be placed at those c-link interface sections locations (e.g., the plurality of side hourglass hooks) where the key link bar interfaces with the keyboard key (e.g., space bar key) and the keyboard chassis at the key location.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the wired or wireless keyboard 146 described herein, a trackpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the keyboard 146 described herein, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the keyboard 146 described herein that allow the user to interface with the information handling system 100 via the video/graphics display device 144, such as a cursor control device (e.g., a mouse 152, trackpad 150, or gesture or touch screen input), and/or a stylus 148, among others. Various drivers and control electronics may be operatively coupled to operate the I/O devices 142 according to the embodiments described herein. The present specification contemplates that the I/O devices 142 may be wired or wireless. In the context of a wireless keyboard 146 as described herein in some embodiments, the wireless keyboard 146 is operatively coupled to the information handling system 100 via a wireless connection via a wireless keyboard radio (not shown) and wireless keyboard antenna (not shown) or may be integrated such as with a laptop base chassis keyboard.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols. In embodiments described herein, the wireless interface device 128 with its radio 130, RF front end 132 and antenna is used to communicate with the wireless keyboard 146 in some example embodiments via, for example, a Bluetooth® (e.g., 2.4 GHz) frequency.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a mouse 152, a wired or integrated keyboard 146 in some embodiment apart from a wireless keyboard, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

As described herein, the information handling system is operatively coupled to a keyboard 146. The keyboard 146 may include any number of keyboard keys 156 that allow a user to actuate them in order to provide alphanumeric and other input to the information handling system 100. Where the information handling system 100 is a laptop-type information handling system 100, the keyboard 146 may be a built-in keyboard 146 that includes a keyboard chassis 172 used to house the keyboard 146 including the one or more keyboard keys 156. Where the information handling system 100 operatively coupled to an external keyboard 146, the keyboard 146 may be operatively coupled to the information handling system 100 via a wired or wireless connection using a universal serial bus (USB) port, a wireless dongle, and or other hardware described herein at the information handling system 100 in an example embodiment. The wired or wireless keyboard 146 may therefore include its own keyboard housing and a keyboard chassis 172 that secures the keyboard 146 into the housing of the keyboard 146. In either example embodiment, the keyboard 146 may be any type of keyboard including a QWERTY-type keyboard that includes any number of alphanumeric keys (e.g., 1, 2, 3, a, b, c) as well as other functional input keys such as the space bar, the control key, a tab key, a plurality of "F" or function keys, a ten pad, caps lock, and the like. It is appreciated, however, that any type of keyboard key layout may be used in the present specification and the present description anticipates these other layout options. However, again, the present specification anticipates and contemplates that the principles described herein are equally applicable to other types of external keyboards 146 described herein.

Because the keyboard keys 156 include various types and sizes of keys, the keyboard 146 may include various types of physical keyswitch actuation devices 170 that are used to prop up or extend the individual keyboard keys 156 in a unpressed position until a user actuates these keyboard keys 156. These physical keyswitch actuation devices 170 include rubber dome devices, scissor-switch devices, butterfly switch devices, among others that impart a physical force against the keyboard keys 156 in order to push these keyboard keys 156 up. When the user actuates these keyboard keys 156, the force imparted by these physical keyswitch actuation devices 170 is overcome and the keyboard key 156 is allowed to interface with a key switch that detects the actuation thereby providing keystroke input to the information handling system 100. However, with relatively larger-sized keys such as a space bar, an "enter" key, a "shift" key and the like, actuation of these keys at the edges of the keyboard key 156 may cause tilting of the keyboard key 156. As such, some of these relatively larger keyboard keys 156 may include a key link bar 158 that causes the entire keyboard key 156 (e.g., a space bar) to move down and up uniformly when actuated by a user. For example, the space bar keyboard key 156 may be actuated by a left-thumb or right-thumb individually by a user and, accordingly, be actuated at a left-most edge of the space bar or a right-most edge of the space bar during operation. The key link bar 158 causes the entire space bar to move down and up despite where on its surface the user actuates the space bar key.

However, because the key link bar 158 is being used, additional mechanical noise is created in previous keyboards 146 as the user both presses down on the space bar as well as when the user releases the force applied to the space bar. This additional noise results from the key link bar 158 interfacing with the key keyboard key 156 (e.g., the space bar) and physically bumping against the keyboard key 156 and keyboard chassis 172. This additional noise or rattle may be undesirable for a user experience.

The key link bar 158, where used with any keyboard key 156, is a rigid bar that imparts rigidity against the underside surface of the keyboard key 156 thereby preventing the tiling of the keyboard key 156 (e.g., space bar) when pressed or actuated by the user. In an embodiment, the key link bar 158 may be made of a rigid material such as a metal. In the embodiments described herein, the key link bar 158 is coated with a noise-reducing coating 160. This noise-reducing coating 160 may absorb or diffuse sound waves created by the contact between the key link bar 158 and either of the keyboard key 156 and the keyboard chassis 172. Additionally, the noise-reducing coating 160 may soften the physical contact between the key link bar 158 and either of the keyboard key 156 and keyboard chassis 172 further reducing the noise produced. This results in a noise reduction during typing and, specifically, actuation of those keyboard keys 156 (e.g., space bar) that have the noise-reducing coating 160 coated key link bar 158.

In an embodiment, the key link bar 158 may be secured to the keyboard chassis 172 using, for example, a plurality of link bar c-clips 162-1, 162-2 at the key location of the keyboard chassis 172. The link bar c-clips 162-1, 162-2 may conform to an outer surface of the key link bar 158 such that the key link bar 158 snaps in and is allowed to rotate within the link bar c-clips 162-1, 162-2. In an embodiment, a lubricant 168 may be coated onto, at least, c-clip interface sections of the key link bar 158 or inner surfaces of the link bar c-clips 162-1, 162-2 to provide lubrication to the key link bar 158 when it is installed and as it rotates along the axis formed by a portion of the key link bar 158 secured by the link bar c-clips 162-1, 162-2.

In an embodiment, the noise-reducing coating 160 is not present at those locations where the key link bar 158 interfaces with the link bar c-clips 162-1, 162-2 allowing for better rotation of the key link bar 158 within the link bar c-clips 162-1, 162-2. It is appreciated that, in some alternative embodiments herein, the link bar c-clips 162-1, 162-2 may be formed on the underside of the keyboard key 156 instead in order to secure the noise-reducing coating 160 coated key link bar 158 to the underside of the keyboard key 156.

The key link bar 158 may also be secured, in an example, embodiment, to the keyboard key 156 via one or more side hourglass hooks 166. In an embodiment, the keyboard key 156 may be a first side hourglass hook 164 and second side hourglass hook 166 formed on the underside of the keyboard key 156. The first side hourglass hook 164 and second side hourglass hook 166 may be formed at extreme edges of the keyboard key 156 (e.g., space bar) such that terminal, bent portions of the key link bar 158 may be received into each of the first side hourglass hook 164 and second side hourglass hook 166. Each of the first side hourglass hook 164 and second side hourglass hook 166 may include internal surface areas that allow the terminal, bent portions of the key link bar 158 to pivot and slide therein. Again, in an alternative embodiment, the first side hourglass hook 164 and second side hourglass hook 166 may be formed on the top surface of the keyboard chassis 172 with the link bar c-clips 162-1,

162-2 being formed on the underside of the keyboard key 156 instead. Therefore, the present specification contemplates an embodiment where the first side hourglass hook 164 and second side hourglass hook 166 are formed on the top surface of the keyboard chassis 172 with the link bar c-clips 162-1, 162-2 being formed on the underside of the keyboard key 156. The present specification further contemplates an embodiment where the first side hourglass hook 164 and second side hourglass hook 166 are formed on the underside of the keyboard key 156 while the link bar c-clips 162-1, 162-2 are formed on the top surface of the keyboard chassis 172. For ease of description and understanding, the present specification will describe the embodiment that includes the first side hourglass hook 164 and second side hourglass hook 166 formed on the underside of the keyboard key 156 with the link bar c-clips 162-1, 162-2 formed on the top surface of the keyboard chassis 172 at a key location of the keyboard key 156 thereby allowing the operative coupling of the key link bar 158 to the keyboard key 156 and keyboard chassis 172 during installation. The keyboard key 156 is also operatively coupled to the physical keyswitch actuation devices 170.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figures 2A, 2B:
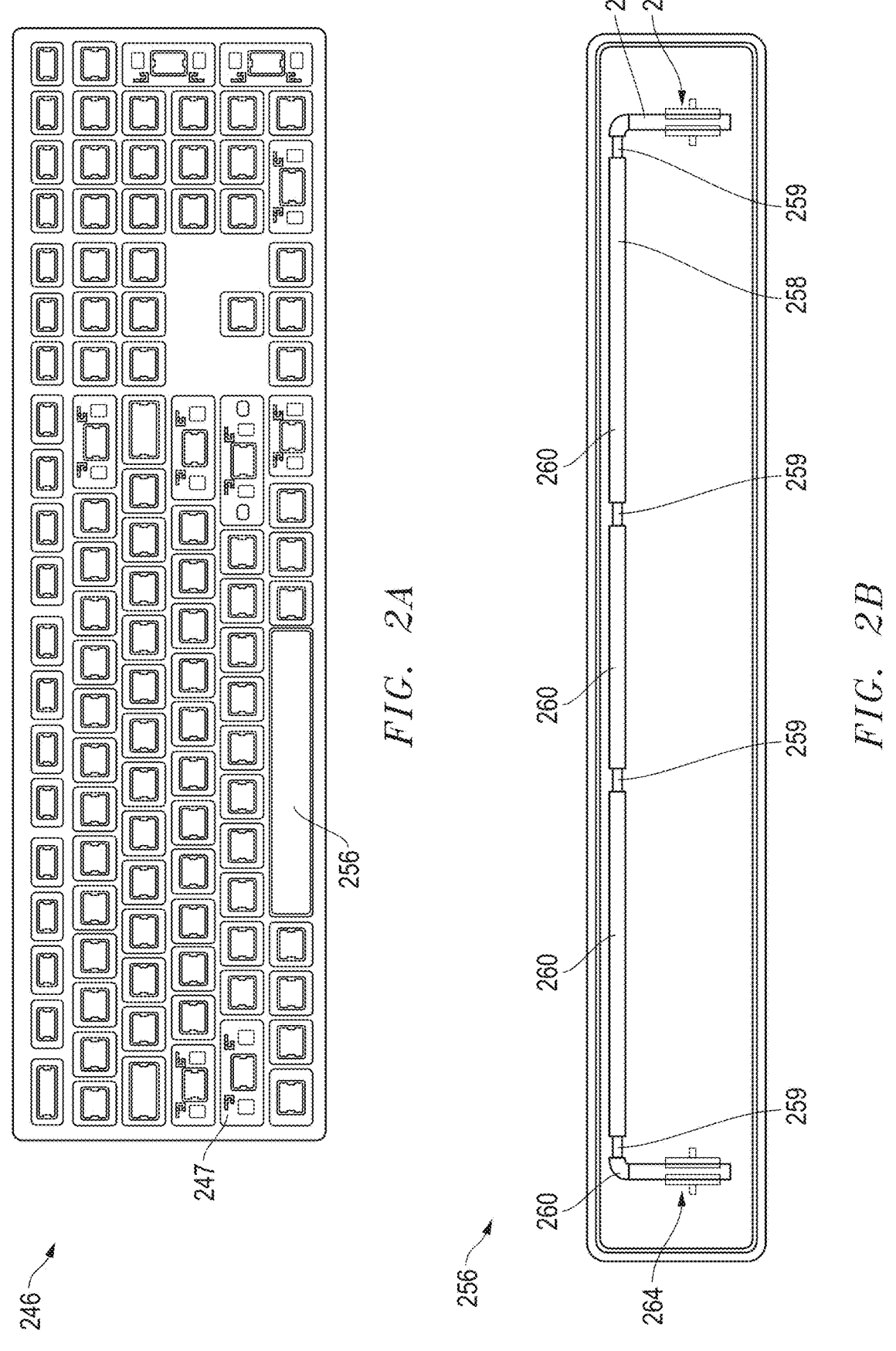
FIG. 2A is a top view graphic diagram of a keyboard chassis having a keyboard key according to an embodiment of the present disclosure.
FIG. 2B is an exploded, bottom view graphic diagram of a keyboard key having a noise-reducing coating coated on the key link bar according to an embodiment of the present disclosure.

FIG. 2A is a top view graphic diagram of a keyboard chassis 246 having a keyboard key 256 according to an embodiment of the present disclosure. FIG. 2A shows a keyboard chassis 246 such as a QWERTY-type keyboard that includes the keyboard key 256 (e.g., a space bar). Because of the size of this keyboard key, a key link bar (described below as 258 in FIG. 2A is used to cause the entire keyboard key 256 to move downward and upward uniformly when a portion of the key is pressed by a user.

FIG. 2B is an exploded, bottom view graphic diagram of a keyboard key 256 having a noise-reducing coating 260 coated on the key link bar 258, where the key link bar 258 is coated, at least partially, with a noise-reducing coating 260 according to an embodiment of the present disclosure. The keyboard key 256 includes a close-up image of the keyboard key 256 removed and rotated to show the underside of the keyboard key 256 in FIG. 2B. In an embodiment, the noise-reducing coating 260 is a polyethylene (PE) coating. A PE coating may include those types of plastics having a chemical formula of $(C_2H_4)_n$ herein "n" is any value. In an embodiment the PE coating may be any low-density or high-density PE that helps to reduce an amount of noise produced by the key link bar 258 hitting either the keyboard key 256 or the keyboard chassis as described herein. In an embodiment, low-density PE coatings may be used to absorb the contact force between the key link bar 258 and the keyboard key 256/keyboard chassis.

The key link bar 258 is shown to have spaces or c-clip interface sections 259 where the noise-reducing coating 260 is not present. In an embodiment, these c-clip interface sections 259 of the key link bar 258 that are not coated with the noise-reducing coating 260 may be used to secure the key link bar 258 to the link bar c-clips formed on the upper surface of the keyboard chassis 246 as described herein. In an embodiment, these c-clip interface sections 259 of the key link bar 258 that do not have the noise-reducing coating 260 on them may be formed by placing a mask over the key link bar 258 and coating the key link bar 258 with the noise-reducing coating 260. The mask may be subsequently removed to form these c-clip interface sections 259 of the key link bar 258 that have not been coated. In another embodiment, the c-clip interface sections 259 of the key link bar 258 that are not coated with the noise-reducing coating 260 may be formed by first coating the key link bar 258 with the noise-reducing coating 260, allowing the noise-reducing coating 260 to cure, and then ablating or otherwise removing the noise-reducing coating 260 from these c-clip interface sections 259. These c-clip interface sections 259 of the key link bar 258 that are not coated with the noise-reducing coating 260 may be aligned with the location of the link bar c-clips formed on the surface of the keyboard chassis 246 at a key location 247 so that the key link bar 258 may be operatively connected or coupled to the keyboard chassis 246 and operatively coupled to a physical keyswitch actuation device for the key location 247.

The keyboard key 256 further includes a first side hourglass hook 264 and a second side hourglass hook 266. The first side hourglass hook 264 may be formed, in this embodiment, at a left-most or near the left end of the keyboard key 256 while the second side hourglass hook 266 is formed at the right-most or near the right end of the keyboard key 256. As described herein, the internal surfaces of the first side hourglass hook 264 and second side hourglass hook 266 are formed such that the bent and terminal ends of the key link bar 258 can pivot and slide therein so that actuation of the keyboard key 256 down and up by the user can occur.

Figure 3:
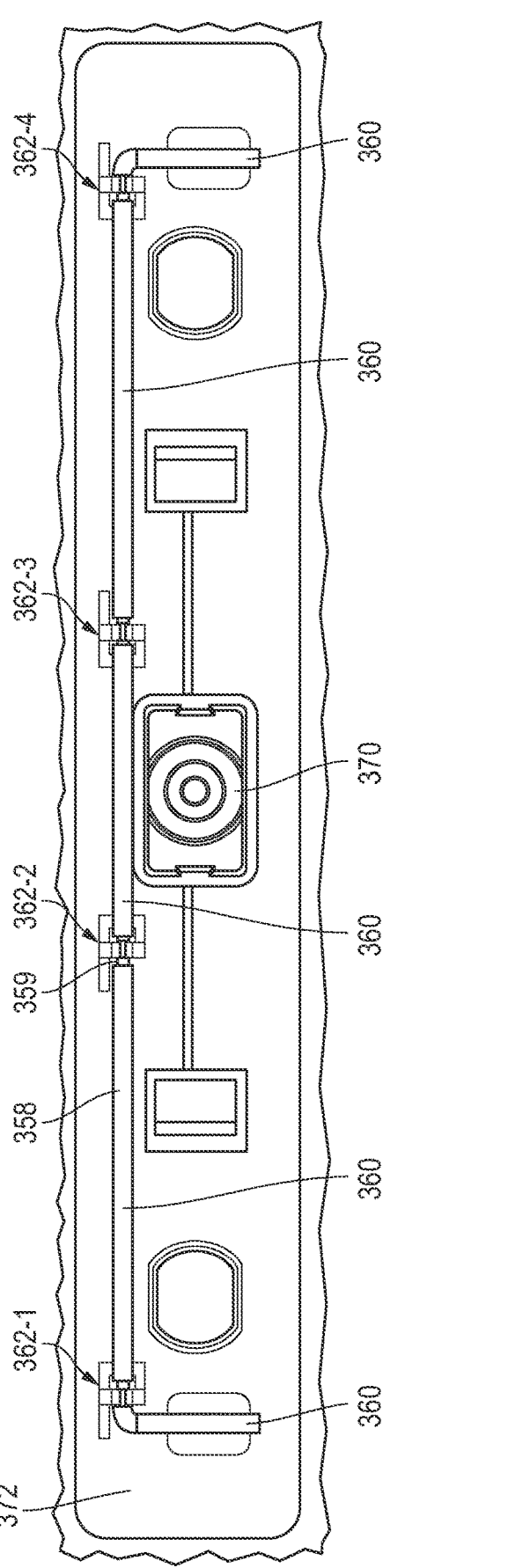

FIG. 3 is a top view of a key location on a keyboard chassis 372 of a keyboard including a key link bar 358 coated with a noise-reducing coating 360 according to an embodiment of the present disclosure. It is appreciated that only a portion of the keyboard chassis 372 corresponding to a space bar key location is shown here and includes that location where the keyboard key is coupled to the keyboard chassis 372 in an example embodiment. It is appreciated that other keyboard keys (not shown) may also be formed on the upper surface of the keyboard chassis 372 at other key locations.

As described herein, the key link bar 358 is coated, at least partially, with a noise-reducing coating 360. In an embodiment, the noise-reducing coating 360 is a polyethylene (PE) coating. A PE coating may include those types of plastics having a chemical formula of $(C_2H_4)$ n herein "n" is any value. In an embodiment the PE coating may be any low-density or high-density PE that helps to reduce an amount of noise produced by the key link bar 358 hitting either the keyboard key or the keyboard chassis 372 as described herein. In an embodiment, low-density PE coatings may be used to absorb the contact force between the key link bar 358 and the keyboard key/keyboard chassis 372.

Again, the key link bar 358 is shown to have c-clip interface sections 259 where the noise-reducing coating 360 is not present. In an embodiment, these c-clip interface sections 359 of the key link bar 358 that are not coated with the noise-reducing coating 360 may be used to secure the key link bar 358 to the link bar c-clips 362-1, 362-2, 362-3, 362-4 formed on the upper surface of the keyboard chassis by clipping the key link bar 358 into the same at these c-clip interface sections 359 as described herein. In an embodiment, these c-clip interface sections 359 of the key link bar 358 that do not have the noise-reducing coating 360 on them may be formed by placing a mask over the key link bar 358 and coating the key link bar 358 with the noise-reducing coating 360. The mask may be subsequently removed to form these c-clip interface sections 359 of the key link bar 358 that have not been coated. In another embodiment, the c-clip interface sections 359 of the key link bar 358 that are not coated with the noise-reducing coating 360 may be formed by first coating the key link bar 358 with the noise-reducing coating 360, allowing the noise-reducing coating 360 to cure, and then ablating or otherwise removing the noise-reducing coating 360 from these c-clip interface sections 359. These c-clip interface sections 359 of the key link bar 358 that are not coated with the noise-reducing coating 360 may be aligned with the location of the link bar c-clips formed on the surface of the keyboard chassis and snapped into the link bar c-clips 362-1, 362-2, 362-3, 362-4 so that the key link bar 358 may be operatively connected or coupled to the keyboard 346.

As described herein, the keyboard chassis 372 includes a plurality of link bar c-clips 362-1, 362-2, 362-3, 362-4 that are used to operatively couple the key link bar 358 to the keyboard chassis 372 at a key location for the keyboard key in an embodiment. The number of link bar c-clips 362-1, 362-2, 362-3, 362-4 may depend on the length of the keyboard key, the amount of weight of the keyboard key, and the anticipated frequency of actuation of the keyboard key by a user, among other factors. Therefore, although FIG. 3 shows that the keyboard chassis 372 for a key location that includes four link bar c-clips 362-1, 362-2, 362-3, 362-4, the present specification contemplates that more or fewer link bar c-clips 362-1, 362-2, 362-3, 362-4 may be formed on the top surface of the keyboard chassis 372 to operatively couple the key link bar 358 to the keyboard chassis 372.

As described in an example embodiment herein, the keyboard chassis 372 further includes a rubber dome 370 as a physical key switch actuation device. The rubber dome 370 is one example of the physical key switch actuation devices that allow a user to press the keyboard key down with the physical key switch actuation device causing the keyboard key to be returned back to an unpressed state. Again, other types of physical key switch actuation devices such as a scissor-switch device or a butterfly switch device, among other types, may be used. With the rubber dome 370 shown in FIG. 3, however, a metal element, magnet, or other contacting device may be formed under the rubber dome 370 that is used to contact with a metal contact formed on a printed circuit board (PCB) (not shown) formed under the keyboard chassis 372 as a keyswitch to record keystrokes. The contact of the metal element with the metal contact on the PCB completes a circuit causing keystroke input to be received at the keyboard key. This keystroke input is interpreted at a processing device (e.g., a GPU, a hardware processing device, an embedded controller, etc.) as keyboard input from the specific key (e.g., space bar input from the space bar).

It is appreciated that the bent terminal ends of the key link bar 358 may be inserted into the first side hourglass hook (e.g., 264 FIG. 2) and second side hourglass hook (e.g., 266, FIG. 2), respectively, to allow the keyboard key to be pressed up by the rubber dome 370 while allowing the bent and terminal ends of the key link bar 358 to pivot and slide within the first side hourglass hook and second side hourglass hook.

Figure 4B:
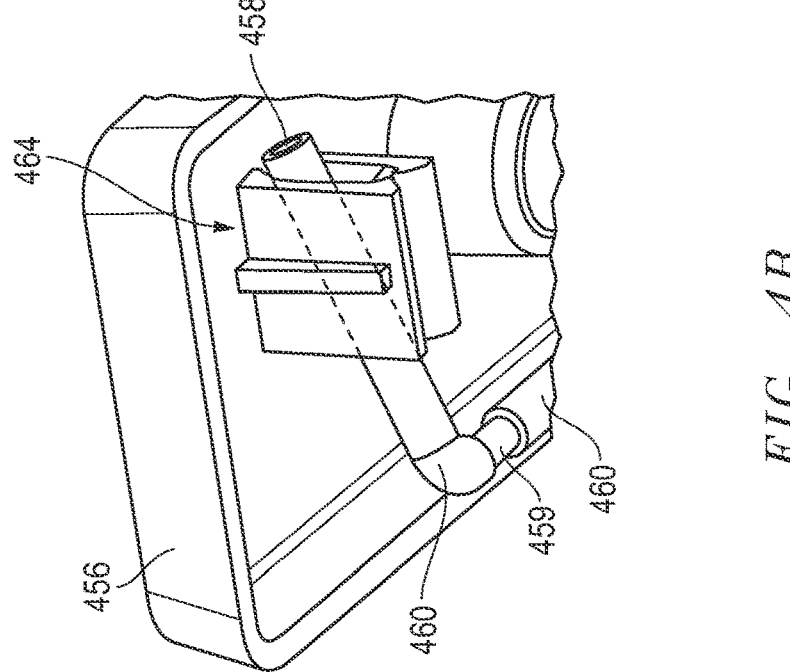
FIG. 4B is a perspective bottom view of a keyboard key having a key link bar coated with a noise-reducing coating in an unactuated state according to an embodiment of the present disclosure.
Figure 4A:
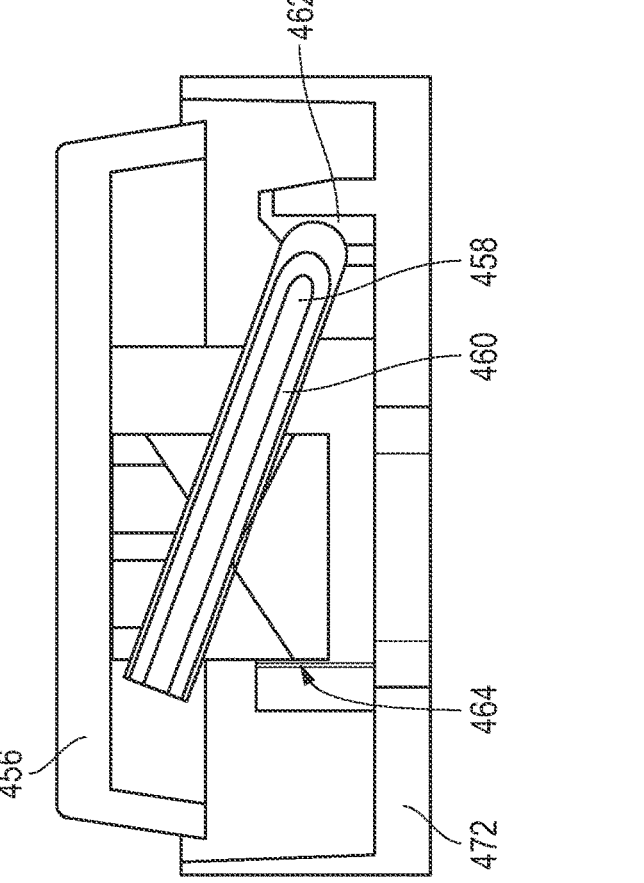
FIG. 4A is a side, cross-sectional view of a keyboard key having a key link bar coated with a noise-reducing coating in an unactuated state according to an embodiment of the present disclosure.

FIG. 4A is a side, cross-sectional view of a keyboard key 456 having a key link bar 458 coated with a noise-reducing coating 460 in an unactuated state according to an embodiment of the present disclosure. Similarly, FIG. 4B is a perspective bottom view of a keyboard key 456 having a key link bar 458 coated with a noise-reducing coating 460 in an unactuated state according to an embodiment of the present disclosure. FIGS. 4A and 4B show the key link bar 458 coupled to the top surface of the keyboard chassis 472 at a key location via the link bar c-clips 462 and operatively coupled to the keyboard key 456 at the side hourglass hook 464 thereby operatively coupling the keyboard key 456 to the keyboard chassis 472.

FIG. 4A shows a cross-sectional view of the key link bar 458. This cross-sectional view shows the noise-reducing coating 460 coating the key link bar 458. As described herein, the noise-reducing coating 460 is a polyethylene (PE) coating. A PE coating may include those types of plastics having a chemical formula of $(C_2H_4)_n$ herein "n" is any value. In an embodiment the PE coating may be any low-density or high-density PE that helps to reduce an amount of noise produced by the key link bar 458 hitting either the keyboard key 458, the keyboard chassis 472, or rattling in the side hourglass hook 464 as described herein. In an embodiment, low-density PE coatings may be used to absorb the contact force between the key link bar 458 and the keyboard key 456 or keyboard chassis 472.

FIG. 4A also shows a cross-sectional view of the second side hourglass hook 464. The side hourglass hook 464 may receive a bent and terminal end of the key link bar 458 therein. As seen, the side hourglass hook 464 has surfaces and an aperture with an hourglass-like shape that allows the key link bar 458 to pivot and slide therein. In the unactuated state of the keyboard key 456 as shown, the side hourglass hook 464 allows a distal end of the bent portion of the key link bar 458 to pivot up and partially slide out while a length of the key link bar 458 pivots or rotates in the c-clip 462 of the keyboard chassis 472.

FIG. 4B shows this pivoting and sliding of the bent and terminal end of the key link bar 458 as well. Additionally, FIG. 4B shows a c-clip interface sections 459 of the key link bar 458 not covered with the noise-reducing coating 460. Again, in an embodiment, this c-clip interface sections 459 of the key link bar 458 that is not coated with the noise-reducing coating 460 may be used to secure the key link bar 458 to the link bar c-clips (e.g., 462 in FIG. 4A) formed on the upper surface of the keyboard chassis 472 as described herein. In an embodiment, these c-clip interface sections 459 of the key link bar 458 that do not have the noise-reducing coating 460 on them may be formed by placing a mask over the key link bar 458 and coating the key link bar 458 with the noise-reducing coating 460. The mask may be subsequently removed to form these c-clip interface sections 459 of the key link bar 458 that have not been coated with the noise-reducing coating 460. In another embodiment, the portions of the key link bar 458 that are not coated with the noise-reducing coating 460 may be formed by first coating the key link bar 458 with the noise-reducing coating 460, allowing the noise-reducing coating 460 to cure, and then ablating or otherwise removing the noise-reducing coating 460 from these c-clip interface sections 459. These c-clip interface sections 459 of the key link bar 458 that are not coated with the noise-reducing coating 460 may be aligned with the location of the link bar c-clips formed on the surface of the keyboard chassis and snapped therein so that the key link bar 458 may be physically and operatively connected or coupled to the keyboard.

Figure 5B:
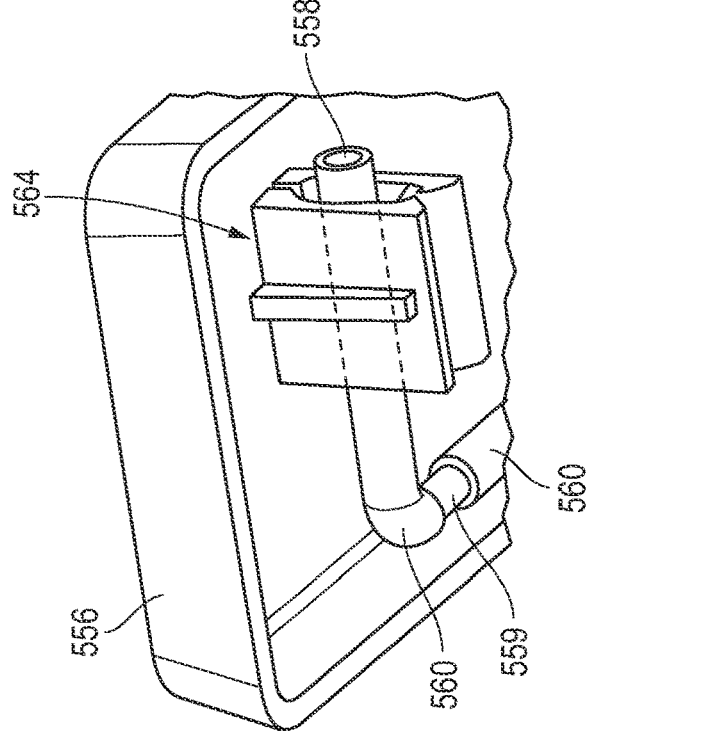
FIG. 5B is a perspective bottom view of a keyboard key having a key link bar coated with a noise-reducing coating in an actuated state according to another embodiment of the present disclosure.
Figure 5A:
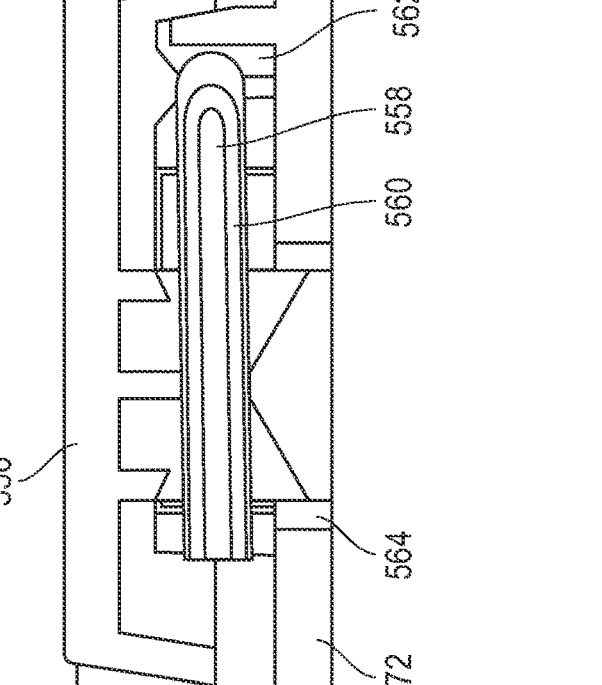
FIG. 5A is a side, cross-sectional view of a keyboard key having a key link bar coated with a noise-reducing coating in an actuated state according to another embodiment of the present disclosure.

FIG. 5A is a side, cross-sectional view of keyboard key 556 having a key link bar 558 coated with a noise-reducing coating 560 in an actuated state according to an embodiment of the present disclosure. Similarly, FIG. 5B is a perspective bottom view of keyboard key 556 having a key link bar 558 coated with noise-reducing coating 560 in an actuated state according to another embodiment of the present disclosure.

FIGS. 5A and 5B show the key link bar 558 coupled to the top surface of the keyboard chassis 572 via the link bar c-clips 562 and operatively coupled to the keyboard key 556 at the side hourglass hook 564 thereby operatively coupling the keyboard key 556 to the keyboard chassis 572.

FIG. 5A shows a cross-sectional view of the key link bar 558 as well. This cross-sectional view shows the noise-reducing coating 560 coating the key link bar 558. As described herein, the noise-reducing coating 560 is a polyethylene (PE) coating. A PE coating may include those types of plastics having a chemical formula of $(C_2H_4)_n$ herein "n" is any value. In an embodiment the PE coating may be any low-density or high-density PE that helps to reduce an amount of noise produced by the key link bar 558 hitting either the keyboard key or the keyboard chassis 572 as described herein. In an embodiment, low-density PE coatings may be used to absorb the contact force between the key link bar 558 and the keyboard key/keyboard chassis 572.

FIG. 5A also shows a cross-sectional view of the second side hourglass hook 564. The side hourglass hook 564 may receive a bent and terminal end of the key link bar 558 therein. As seen, the side hourglass hook 564 has surfaces and an aperture with an hourglass-like shape that allow the key link bar 558 to pivot and slide therein. In the actuated state of the keyboard key 556 as shown, the side hourglass hook 564 allows a distal end of the bent portion of the key link bar 558 to pivot down relative to that shown in FIG. 4A and to move the bent portion of the key link bar 558 to generally horizontal position as it partially slides in the side hourglass hook 564. The length of the key link bar 558 is also shown to have pivoted and rotated in link bar c-clip 562 relative to that shown in FIG. 4A to move the bent portion of the key link bar 558 to a generally horizontal position.

FIG. 5B shows this pivoting and sliding of the bent and terminal end of the key link bar 558 as well. Additionally, FIG. 5B shows a c-clip interface section 559 of the key link bar 558 not covered with the noise-reducing coating 560. Again, in an embodiment, this c-clip interface section 559 of the key link bar 558 that is not coated with the noise-reducing coating 560 may be used to secure the key link bar 558 to the link bar c-clips 562 formed on the upper surface of the keyboard chassis 572 as described herein. In an embodiment, these c-clip interface sections 559 of the key link bar 558 that do not have the noise-reducing coating 560 on them may be formed by placing a mask over the key link bar 558 and coating the key link bar 558 with the noise-reducing coating 560. The mask may be subsequently removed to form these c-clip interface sections 559 of the key link bar 558 that have not been coated with the noise-reducing coating 560. In another embodiment, the c-clip interface sections 559 of the key link bar 558 that are not coated with the noise-reducing coating 560 may be formed by first coating the key link bar 558 with the noise-reducing coating 560, allowing the noise-reducing coating 560 to cure, and then ablating or otherwise removing the noise-reducing coating 560 from these c-clip interface sections 559. These c-clip interface sections 559 of the key link bar 558 that are not coated with the noise-reducing coating 560 may be aligned with the location of the link bar c-clips formed 562 on the surface of the keyboard chassis and snapped therein so that the key link bar 558 may be physically and operatively connected or coupled to the keyboard.

Figure 6:
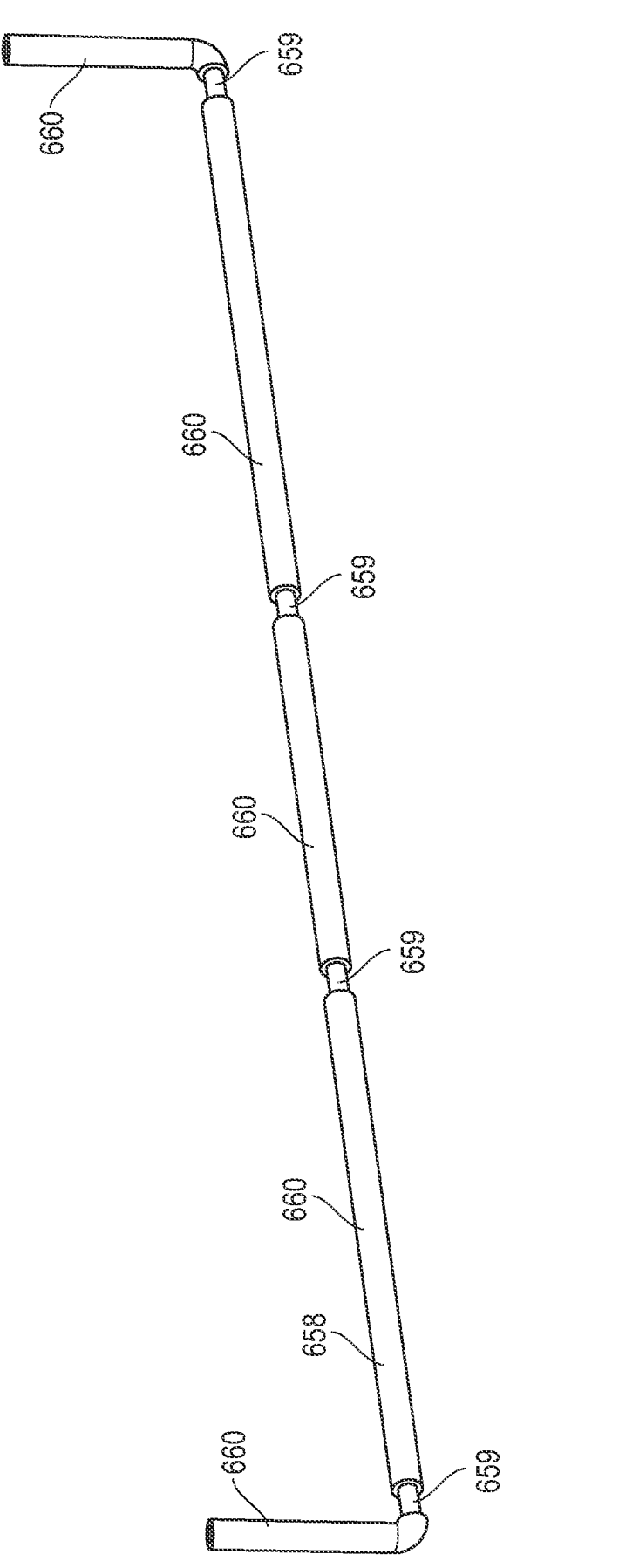
FIG. 6 is a perspective view of a coated link bar for a keyboard key according to another embodiment of the present disclosure.

FIG. 6 is a perspective view of a key link bar 658 for a keyboard key according to another embodiment of the present disclosure. FIG. 6 shows the key link bar 658 being removed from the keyboard key and keyboard chassis shown in FIG. 5A for example.

The key link bar 658 is shown in FIG. 6 to be coated, at least partially, with a noise-reducing coating 660. The key link bar 658 is also shown to have c-clip interface sections 659 where the noise-reducing coating 660 is not present. In an embodiment, these c-clip interface sections 659 of the key link bar 658 that are not coated with the noise-reducing coating 660 may be used to secure the key link bar 658 to the link bar c-clips formed on the upper surface of the keyboard chassis as described herein. In an embodiment, these c-clip interface sections 659 of the key link bar 658 that do not have the noise-reducing coating 660 on them may be formed by placing a mask over the key link bar 658 and coating the key link bar 658 with the noise-reducing coating 660. The mask may be subsequently removed to form these c-clip interface sections 659 of the key link bar 658 that have not been coated. In another embodiment, the c-clip interface sections 659 of the key link bar 658 that are not coated with the noise-reducing coating 660 may be formed by first coating the key link bar 658 with the noise-reducing coating 660, allowing the noise-reducing coating 660 to cure, and then ablating or otherwise removing the noise-reducing coating 660 from these c-clip interface sections 659. These c-clip interface sections 659 of the key link bar 658 that are not coated with the noise-reducing coating 660 may be aligned with the location of the link bar c-clips formed on the surface of the keyboard chassis so that the key link bar 658 may be snapped in to physically and operatively connect or couple the key link bar to the keyboard chassis at a key location and couple the key to a physical key switch actuation device.

FIG. 7 is a flow diagram illustrating a method 700 of manufacturing a keyboard with a keyboard key having a key link bar coated with a noise-reducing coating according to an embodiment of the present disclosure. The method 700 may include, at block 705, forming a keyboard housing. As described herein, the keyboard may be a keyboard of a laptop-type information handling system, a wired keyboard operatively coupled to a USB port of an information handling system, or a wireless keyboard operatively coupled to an information handling system via a radio and antenna. Each of these types of keyboards may include a housing such as with a laptop-type keyboard where the housing may include a base chassis that may also house a processing device, a cooling system, a hard drive, and other components of the information handling system. The keyboard housing may be made of any suitable material including plastic, aluminum, or another suitable material depending on design.

At block 710, the method 700 further includes forming a plurality of key switch actuators on a keyboard printed circuit board (PCB). The keyboard PCB may include any components such as electrical traces and the key switches that, when actuated, transmit electrical input keystroke signals to a hardware processor indicating actuation of a keyboard key in some example embodiments. This keyboard PCB may also be secured into the keyboard housing using, for example, fasteners such as screws or adhesives such as a glue.

At block 715, a rubber dome layer is formed over the plurality of key switch formed on the keyboard PCB. As described herein, this rubber dome layer includes a plurality of rubber domes as part of physical key switch detection devices formed over each of the plurality of key switches formed on the PCB. It is appreciated that these rubber domes are one example of the physical key switch actuation devices that allow a user to press the keyboard key down with the physical key switch actuation device causing the keyboard key to be returned back to an unpressed state as well as be able to provide input at the keyboard. Other types of physical key switch actuation devices such as a scissor-switch device or a butterfly switch device, among other types, may also be used and the present specification contemplates the use of these types of physical key switch actuation devices. With the rubber domes (e.g., as shown in FIG. 3), however, a metal element, magnet, or other contacting device may be formed under the rubber dome that is used to contact with a metal contact such as the key switch formed on the keyboard PCB. The contact of the metal element with the metal contact of the key switch on the PCB completes a circuit causing input to be received at the keyboard key. This input is interpreted at a processing device (e.g., a GPU, a hardware processing device, an embedded controller, etc.) as keyboard input from the keystroke of a specific key (e.g., space bar input from the space bar).

The method 700 may include forming a keyboard chassis at block 720. The keyboard chassis may include a number of keyboard keys that may be operatively coupled to the keyboard as described herein. Again, the arrangement of these keys may depend on a chosen layout selected such as that with a QWERTY-type keyboard.

The method 700 may include, at block 725, forming a plurality of link bar c-clips to a top surface of a keyboard chassis at a first key location. As described herein, the keyboard may include any number of keyboard keys at key locations that allow a user to actuate them in order to provide alphanumeric and other input to an information handling system. Where the information handling system is a laptop-type information handling system, the keyboard may be a built-in keyboard that includes a keyboard chassis used to house the keyboard including the one or more keyboard keys. Where the information handling system is a stand-alone-type keyboard used with an information handling system, the keyboard may be operatively coupled to the information handling system via a wired or wireless connection using a USB port, a wireless dongle, and or other hardware described herein at the information handling system. The wired or wireless keyboard may therefore include its own keyboard chassis that secures the keyboard into the housing of the keyboard. In either example embodiment, the keyboard may be any type of keyboard including a QWERTY-type keyboard that includes any number of alphanumeric keys (e.g., 1, 2, 3, a, b, c) as well as other functional input keys such as the space bar, the control key, a tab key, a plurality of "F" or function keys, a ten pad, caps lock, and the like. It is appreciated, however, that any type of keyboard key layout may be used in the present specification and the present description anticipates these other layout options.

At block 730, the method 700 includes forming a key link bar. As described herein, the key link bar may be made of a rigid material such as a metal. As shown in, for example, FIGS. 2, 3, 4A, 4B, 5A, 5C, and 6, the key link bar may include bent terminal ends that are bent, generally, 90 degrees away from a straight shaft. As described herein, these bent terminal ends may be configured to interface with a side hourglass hook formed, in an embodiment, to an underside of a keyboard key.

At block 735, the key link bar is further prepared by, in an embodiment, placing a mask on the key link bar at those locations along at link bar c-clip interface sections that are clipping locations or those locations where the link bar c-clips are to be operatively coupled to the key link bar. In other words, the c-clip interface sections are snapped into the c-clips on the keyboard chassis at a key location. This mask may include any material that prevents the noise reducing coating from being applied to these link bar c-clip interface sections for the clipping locations with c-clips when installed.

The method 700 may further include, at block 740, coating the key link bar with a noise-reducing coating. The noise-reducing coating may be a PE coating. A PE coating may include those types of plastics having a chemical formula of $(C_2H_4)$ n herein "n" is any value. In an embodiment the PE coating may be any low-density or high-density PE that helps to reduce an amount of noise produced by the key link bar hitting either the keyboard key or the keyboard chassis as described herein. In an embodiment, low-density PE coatings may be used to absorb the contact force between the key link bar and the keyboard key/keyboard chassis. Again, pursuant to block 735, the entire key link bar is coated with the noise-reducing coating except at those link bar c-clip interface sections that are clipping locations due to the mask applied. These c-clip interface sections of the key link bar that are not coated with the noise-reducing coating may be used to secure the key link bar to the link bar c-clips formed on the upper surface of the keyboard chassis as described herein.

At block 745, the mask may be subsequently removed to form these link bar c-clip interface sections of the key link bar that have not been coated. It is appreciated that other methods may be used to form these link bar c-clip interface sections for link bar c-clip clipping locations. In another example embodiment, therefore, the link bar c-clip interface sections of the key link bar that are not coated with the noise-reducing coating may be formed by first coating the key link bar with the noise-reducing coating, allowing the noise-reducing coating to cure, and then ablating or otherwise removing the noise-reducing coating from these portions. These portions of the key link bar that are not coated with the noise-reducing coating may be aligned with the location of the link bar c-clips formed on the surface of the keyboard chassis so that the key link bar may be physically connected or coupled to the keyboard.

The method 700 also includes, at block 750, coating the link bar c-clips formed on the surface of the keyboard chassis or coating the link bar c-clip interface sections of the key link bar with a lubricant. In an embodiment, a lubricant may be coated onto, at least, inner surfaces of the link bar c-clips to provide lubrication to the key link bar when it is installed and as it rotates in the c-clips along the axis formed by a portion of the key link bar secured by the link bar c-clips. In another embodiment, the link bar c-clip interface sections of the key link bar may be lubricated before the key link bar is snapped into the c-clips on the keyboard chassis.

The method 700 further includes, at block 755, forming a keyboard key that includes a plurality of side hourglass hooks formed at the underside edges of the keyboard key. The side hourglass hooks may receive the bent and terminal end of the key link bar therein. As described herein, the side hourglass hook has an aperture with an hourglass shape and surfaces that allow the key link bar to pivot and slide therein. The length of the terminal ends of the key link bar prevent the key link bar from falling out of the side hourglass hooks when installed in the c-clips of key location on the keyboard chassis. In an unactuated state of the keyboard key, the side hourglass hook allows a distal end of the bent portion of the key link bar to pivot up while the length of the key link bar can pivot within the c-clips at the keyboard chassis. In the actuated state of the keyboard key, the side hourglass hook allows a distal end of the bent portion of the key link bar to pivot down relative to that shown in FIG. 4A, for example, to move the bent portion of the key link bar to a generally horizontal orientation. The length of the key link bar, when the keyboard key is in an actuated state, may be rotated within the c-clips when the bent terminal portion of the key link bar is moved to a generally horizontal position within the side hourglass hooks.

At block 760, the method 700 includes operatively coupling the keyboard key to the keyboard chassis by operatively coupling the key link bar to the plurality of side hourglass hooks formed at edges of the keyboard key. This allows the key link bar to be coupled to the keyboard key via the side hourglass hooks and to the keyboard chassis via the link bar c-clips. This secures the keyboard key to keyboard chassis and is ready to be actuated by a user to provide input to an information handling system that the keyboard is operatively coupled to.

The method 700 further includes operatively coupling the key link bar to the keyboard chassis via the link bar c-clips at block 765. This may be done by aligning, in an embodiment, those portions of the key link bar that have not been coated (e.g., the link bar c-clip clipping locations) with the noise-reducing coating to the link bar c-clips formed on the surface of the keyboard chassis and pressing the key link bar and keyboard key into those clips. As described herein, the link bar c-clips allows the key link bar to rotate along an axis of the key link bar that is secured by the link bar c-clips. Further, the keyboard key may interface and be operatively coupled to the rubber dome or other physical key switch actuation device at the key location as well. At this point, the method 700 may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A keyboard operatively couplable to an information handling system comprising:
a keyboard chassis with a plurality of physical keyswitch actuation devices at a plurality of key locations;
a keyboard key operatively coupled to the keyboard chassis at a first key location via a key link bar;
the key link bar having a bent terminal end operatively coupled to the keyboard key via a side hourglass hook on the underside of the keyboard key; and
a noise-reducing coating formed over the key link bar to reduce noise associated with actuation of the keyboard key by a user, wherein the noise-reducing coating formed over the bent terminal end of the key link bar is inserted through an opening in the side hourglass hook on the underside of the keyboard key.

2. The keyboard of claim 1 further comprising:
a plurality of link bar c-clips to operatively couple a length of the key link bar to the keyboard chassis.

3. The keyboard of claim 1, wherein the key link bar has a c-clip interface section without the noise-reducing coating on the key link bar where the link bar c-clip operatively couples the key link bar to the keyboard chassis at the key location.

4. The keyboard of claim 1, wherein the noise-reducing coating is a polyethylene coating.

5. The keyboard of claim 1 further comprising:
a plurality of side hourglass hooks formed at underside edges of the keyboard key to secure plural bent terminal ends of the key link bar to an underside surface of the keyboard key, the plurality of side hourglass hooks formed to allow the key link bar to pivot and slide within the openings of the plurality of side hourglass hooks.

6. The keyboard of claim 1 further comprising:
a lubricant layer disposed on a plurality c-clip interface sections of the key link bar that rotate in the link bar c-clips used to secure the key link bar to the keyboard chassis at the key location.

7. The keyboard of claim 1 further comprising:
the keyboard key is operatively coupled to a first keyswitch actuation device for the keyboard key disposed at the first key location of the keyboard chassis.

8. A method of manufacturing a keyboard comprising:
forming a plurality of link bar c-clips to a top surface of a keyboard chassis at a key location;
forming a keyboard key including a plurality of side hourglass hooks formed at underside edges of the keyboard key;
forming a key link bar;
coating the key link bar with a noise-reducing coating; and
operatively coupling the keyboard key to the keyboard chassis by operatively coupling the key link bar to the plurality of side hourglass hooks formed at edges of the keyboard key including the coating on the key link bar and the ends of the key link bar inserted through apertures in each of the plurality of side hourglass hooks on the underside edges of the keyboard key, and operatively coupling the key link bar to the keyboard chassis via the link bar c-clips.

9. The method of claim 8, wherein the keyboard key is a space key on the keyboard.

10. The method of claim 8 further comprising:
removing the noise-reducing coating from the key link bar at c-clip interface sections along the key link bar where the link bar c-clips operatively couple the key link bar to the keyboard chassis.

11. The method of claim 8 further comprising:
forming a mask over the key link bar at c-clip interface sections along the key link bar where the link bar c-clips operatively couple the key link bar to the keyboard chassis prior to coating the key link bar with a noise-reducing coating to form the c-clip interface sections along the key link bar where the noise-reducing coating is not present.

12. The method of claim 8 further
placing a lubricant on the link bar c-clips prior to coupling the key link bar to the link bar c-clips.

13. The method of claim 12, wherein the plurality of side hourglass hooks formed on the keyboard key have an aperture shaped to receive the key link bar and allows the key link bar to pivot and slide within the plurality of side hourglass hooks.

14. The method of claim 12, wherein the noise-reducing coating is a polyethylene coating.

15. A keyboard comprising:
a keyboard key operatively coupled to a keyboard chassis via a key link bar, where the key link bar is operatively coupled to the keyboard key via a plurality of side hourglass hooks formed on an underside of the keyboard key;
the key link bar is coated with a noise-reducing coating to reduce noise associated with actuation of the keyboard key by a user, wherein the noise-reducing coating formed on ends of the key link bar is inserted through apertures in the side hourglass hooks formed on the underside of the keyboard key; and
the keyboard chassis having a first key location and including link bar c-clips to operatively couple the key link bar to the keyboard chassis at the first key location; and
the keyboard key operatively coupled to a physical keyswitch actuation device disposed at the first key location of the keyboard chassis.

16. The keyboard of claim 15, wherein the key link bar is not coated with the noise-reducing coating on a portion of the key link bar at a plurality of c-clip interface sections where the link bar c-clips secure the key link bar to the keyboard chassis at the first key location.

17. The keyboard of claim 15, wherein the noise-reducing coating is a polyethylene coating.

18. The keyboard of claim 15 further comprising:

a lubricant layer formed on a plurality of c-clip interface sections that snap into the plurality of link bar c-clips to secure the key link bar to the keyboard chassis and where the key link bar rotates in the plurality of link bar c-clips.

19. The keyboard of claim 15, wherein the plurality of side hourglass hooks formed on the keyboard key each have the apertures to receive bent terminal ends of the key link bar having the noise-reducing coating to allow the bent terminal ends with the noise-reducing coating of the key link bar to pivot within the plurality of side hourglass hooks.

20. The keyboard of claim 15, wherein the keyboard key is a space key on the keyboard.

\* \* \* \* \*